United States Patent [19]

Meussner

[11] Patent Number: 4,946,523
[45] Date of Patent: Aug. 7, 1990

[54] METHOD AND APPARATUS FOR USE IN MANUFACTURING SAFETY GLASS LAMINATES

[75] Inventor: Mark A. Meussner, Allen Park, Mich.

[73] Assignee: Ford Motor Company, Dearborn, Mich.

[21] Appl. No.: 288,593

[22] Filed: Dec. 22, 1988

[51] Int. Cl.$^5$ .............................................. B32B 31/20
[52] U.S. Cl. ...................................... 156/64; 156/99;
156/102; 156/103; 156/351; 156/358
[58] Field of Search ................. 156/99, 102, 103, 350,
156/351, 358, 64

[56] References Cited

U.S. PATENT DOCUMENTS

| | | |
|---|---|---|
| 3,306,087 | 2/1967 | Barringer . |
| 3,582,305 | 6/1971 | Dunlap et al. . |
| 3,701,643 | 10/1972 | Frank . |
| 3,855,830 | 12/1974 | Kitanosono et al. . |
| 3,869,892 | 3/1975 | Higham et al. . |
| 3,891,420 | 6/1975 | Frank . |
| 3,928,994 | 12/1975 | Ichiryu et al. . |
| 4,123,927 | 11/1978 | Brauer . |
| 4,215,558 | 8/1980 | Shiguma et al. . |
| 4,475,937 | 10/1984 | Nitschke . |
| 4,696,713 | 9/1987 | Okafuji et al. ...................... 156/358 |

*Primary Examiner*—Robert A. Dawson
*Attorney, Agent, or Firm*—Roger L. May; Keith L. Zerschling

[57] ABSTRACT

Apparatus operable in accordance with the method of the present invention is provided for automatically controlling the operation of a de-air/tacker machine used in the manufacture of safety glass laminates to remove air from and promote bonding within the laminates. The machine comprises pinch rolls mounted to a carriage which is in turn mounted for rotational movement about a generally horizontal axis relative to a support frame. The pinch rolls define a pressure nip through which the laminates pass to be processed. A motor is connected to the carriage for rotating the carriage, and hence the pinch rolls, about the generally horizontal axis and a digital encoder is provided for sensing rotational operating movement of the motor. A computer is connected to the motor and the encoder for operating the motor in accordance with a predefined sequence for each laminate which is processed such that the carriage is positioned to maintain the pinch rolls substantially normal to the laminates which are therefore balanced within the pinch rolls as the laminates are passed through the machine to thereby prevent breakage of glass templates of the laminates. An operator of the machine can rapidly select one of a number of stored programs to control the carriage for the production of corresponding laminates or can define a new program as necessary for new laminate designs or to customize operation in accordance with the skill and experience of the operator.

16 Claims, 3 Drawing Sheets

METHOD AND APPARATUS FOR USE IN MANUFACTURING SAFETY GLASS LAMINATES

BACKGROUND OF THE INVENTION

The present invention relates generally to safety glass laminates such as those used as automotive windshields and, more particularly, to a method and apparatus for controlling the rotational positioning of a machine used during production to apply pressure to such laminates to remove air from the laminates and to promote bonding between layers of the laminates.

In the manufacture of safety glass laminates, two glass templates, one slightly larger than the other, are initially cut from glass sheets. The templates, separated by a powder coating to prevent bonding, are placed with the smaller template upon the larger template onto a bending jig which is then passed through an oven heated between approximately 1200° F. and 1400° F. to bend the templates to a desired curvature corresponding to the bending jig. After being cooled, the formed templates are separated and sheets of transparent plastic, such as polyvinyl butyral, are sandwiched between the glass templates. The resulting laminates are then heated to around 140° F. and passed through pressure rollers to remove air from and to promote bonding of the glass/plastic laminates.

More specifically, the heated laminates are first passed through a "de-air" machine which comprises a series of pinch roll pairs which are pneumatically or otherwise forced against each other to define a pressure nip through which the laminates are passed. The pinch roll pairs are mounted in a carriage which is rotatable within a support frame about a generally horizontal axis such that the carriage can be rotated as the laminates pass through the nip of the pinch roll pairs. By rotating the carriage as the laminates pass through, the pinch roll pairs can be maintained substantially normal to the laminates which are therefore balanced within the pinch rolls to prevent breakage of the glass templates of the laminates. The de-aired laminates are then heated to somewhere between 160° F. and 180° F. depending on laminate mass, assembly line speed and other variables, by passage through an oven from which the laminates are conveyed to a "tacker" machine which is substantially identical to the de-air machine. From the tacker machine, the laminates are transferred to an autoclave wherein they are subjected to high pressure and temperature to complete the glass/plastic bonding step of their manufacture.

Operation of the de-air and tacker machines have been a continuing source of problems in the manufacture of safety glass laminates. Operating procedures and control systems previously used include manual operation by means of a large control wheel coupled to the carriage supporting the pinch roll pairs. An experienced operator rotates the carriage about a generally horizontal axis to position the carriage such that the pinch roll pairs are substantially normal to the laminates which are therefore balanced within the pinch roll pairs as the laminates pass through the machine. Manual operation requires an operator per machine, makes repeatable performance of the machine effectively impossible due to differing operators and skill levels of those operators, and also results in approximately 10% to 20% breakage of the safety glass laminates. In addition, when the machines are manually controlled, laminates which are broken are not merely cracked such that they can progress cleanly through the machine for later disposal but frequently the glass templates of the laminates are shattered in the machines resulting in stoppage of the assembly line for clean up with resulting lost time and production.

In view of these problems, attempts have been made to automate the operation of the de-air and tacker machines. In one arrangement, the machine is spring biased toward the orientation which is assumed upon exit of a laminate from the machine. The machine is then moved or rotated, manually or hydraulically, in the opposite direction to the orientation required for entrance of a laminate into the machine. Rotational movement toward the spring-biased exit position is then controlled by pulsating application of a motion restraining brake. This system results in a jerky approximation of manual control which does not appreciably improve laminate breakage; however, the manual operators are eliminated except as required for periodic clean up of the machines necessitated by continuing laminate breakage.

In another arrangement, the angular rotational orientation of the carriage of the machine is controlled by a hydraulic cylinder. A series of control switches or a mechanical cam and cam follower are provided to control the hydraulic cylinder in an attempt to simulate and improve on the manual control procedure. Unfortunately, hydraulics tend to produce only a smooth rotational movement as opposed to the more variable manual control and hydraulics are affected by machine temperatures such that substantial variations in operation of the machine occur due to ambient temperature changes. Further, such switch/cam control does not lend itself to quick change over as production changes from one form or design of safety glass laminate to another.

Accordingly, there is a need for a method and apparatus for controlling a de-air/tacker machine used in the manufacture of safety glass laminates and including pinch roll pairs mounted in a carriage which is rotatable about a generally horizontal axis such that the carriage is automatically rotated as laminates pass through a nip defined by the pinch roll pairs to maintain the pinch roll pairs substantially normal to the laminates such that the laminates are balanced within the pinch rolls throughout their passage through the machine to thereby effectively eliminate breakage of the glass templates of the laminates. Preferably, the method and apparatus would permit the automatic rotational movement of the carriage to be selected rapidly to correspond to any one of a number of standard laminate forms or designs which are to be manufactured utilizing the machine and further permit new rotational movement sequences to be defined by an operator of the machine as necessary.

SUMMARY OF THE INVENTION

This need is met by a method and apparatus in accordance with the present invention which computer controls the operation of a carriage of a de-air/tacker machine by means of a dc servo motor which provides precise, repetitive control of the carriage such that laminates are passed through the machine with substantially no breakage of glass templates of the laminates. Even if a glass template is cracked, the present invention provides sufficiently smooth handling by the de-air/tacker machines that the damaged laminate typically passes through the machines and can be later discarded with no down time for the production line. In certain preferred embodiments, programs or "recipes" defining carriage laminate handling rotational sequences for a number of different laminate designs are stored in a computer and called up by a machine operator to control the dc servo motor coupled to the carriage. Operation of the dc servo motor is then controlled in compliance with the selected program sequence. Alternately, as a feature of certain preferred embodiments, a program sequence can be defined by the operator if no corresponding sequence is stored or an existing program can be modified or "tweaked" to optimize machine performance in accordance with the operator's skill and experience.

In accordance with one aspect of the present invention, apparatus is provided for controlling the operation of a machine used in the manufacture of a safety glass laminate to remove air from and promote beonding within the laminate. The machine comprises pinch roll means mounted for rotational movement about a generally horizontal axis and defining a pressure nip by rolls through which the laminate passes. The apparatus comprises motive means or rotating the pinch roll means about the generally horizontal axis and encoder means for sensing the motion of the motive means. Control means is connected to the motive means and the encoder means for operating the motive means to rotate the pinch roll means in accordance with a sequence predefined for the laminate to maintain the pinch roll means oriented substantially normal to the laminate as it passes through the pinch roll means.

Preferably, the control means comprises sequence storage means for storing a number of predefined sequences which each correspond to different laminates and the apparatus further comprises sequence selection means connected to the control means for selecting one of the predefined sequences. The sequence selection means may include sequences definition means for defining a sequence which is not included within the number of stored predefined sequences. While the apparatus may be operated as just described, by monitoring the position of the motive means and maintaining a running record of the corresponding orientation of the pinch roll means, the apparatus may further comprise position sensing means coupled to the pinch roll means and the control means for sensing the angular orientation of the pinch roll means about the axis and generating signals representative of its angular orientation. Such angular orientation signals are passed to the control means such that the position of the pinch roll means may be monitored and controlled as a function of such monitoring.

Operation of the apparatus may be facilitated by including within the apparatus laminate sensing means coupled to the control means for sensing the entrance of the laminate into the pinch roll means such that the control means can properly commence performance of the predefined sequence. The laminate sensing means may further provide for sensing the exit of the laminate from the pinch roll means such that the control means can return the pinch roll means to a home position after an appropriate delay, if required, in preparation for the next laminate to be processed by the machine. Preferably, the laminate sensing means comprises a pair of optical sensors, one optical sensor positioned on a laminate receiving side of the nip of the pinch roll means and one optical sensor positioned on a laminate exiting side of the nip.

The motive means may comprise a dc servo motor coupled to the pinch roll means through a gearbox and the control means may comprise a digital computer programmed to control the dc servo motor in response to a program corresponding to the predefined sequence. For such structure, the sequence selection means may comprise input switches connected to the digital computer.

In accordance with another aspect of the present invention, a method is provided for controlling the operation of a machine used in the manufacture of a safety glass laminate to remove air from and promote a bonding operation within the laminate. The machine comprises pinch roll means mounted for rotational movement about a generally horizontal axis and defining a pressure nip by rolls through which the laminate passes. The method comprises the steps of: coupling motive means to the pinch roll means for rotating the pinch roll means about the axis; connecting encoder means to the motive means for sensing the motion of the motive means; and, operating the motive means to rotate the pinch roll means in accordance with a sequence predefined for the laminate to maintain the pinch roll means oriented substantially normal to the laminate as it passes through the pinch roll means.

The method may further comprise the steps of storing a number of predefined sequences which each correspond to different laminates and selecting one of the predefined sequences corresponding to the laminate. The additional step of defining a sequence which is not included within the number of stored sequences may be performed for a new laminate or to optimize performance of the method in accordance with an operator's skill and experience. To facilitate operation of the method of the present invention, the method may further comprise the step of sensing the positioning of the laminate within the pinch roll means such that the step of operating the motive means in accordance with a predefined sequence for each laminate can commence at an appropriate time corresponding to movement of the laminate.

The step of sensing the positioning of the laminate within the pinch roll means may comprise sensing the entrance of the laminate into the pinch roll means and sensing the exit of the laminate from the pinch roll means. For such sensing, the method may further comprise the step of positioning the pinch roll means to a home position in response to sensing the exit of the laminate from the pinch roll means to initialize the operating position of the machine. While additional steps may be included where necessary or desired, the predefined sequence generally may comprise three steps, each of the steps comprising the substeps of delaying movement of the pinch roll means for a defined period of time, then moving the pinch roll means at a defined speed through a defined distance. The three steps correspond to the three portions of a safety glass laminate utilized for automotive windshields, i.e. the central portion of the windshield and the angular sections or "wings" formed on both ends of the central portion.

It is an object of the present invention to provide a method and apparatus for automatically controlling a de-air/tacker machine used in the manufacture of a safety glass laminate to effectively eliminate breakage of glass templates of the laminate due to operation of the de-air/tacker machine; to provide a method and apparatus for controlling a de-air/tacker machine used in the manufacture of a safety glass laminate and including pinch roll pairs mounted in a carriage which is rotatable about a generally horizontal axis wherein the carriage is automatically rotated as the laminate passes through a nip defined by the pinch roll pairs to maintain the pinch roll pairs substantially normal to the laminate throughout its passage through the machine; to provide a method and apparatus for controlling a de-air/tacker machine used in the manufacture of a safety glass laminate and including pinch roll pairs mounted in a carriage which is rotatable about a generally horizontal axis wherein one of a number of stored rotational movement sequences of the carriage corresponding to the laminate to be manufactured can be rapidly selected to control the machine; and, to provide a method and apparatus for controlling a de-air/tacker machine used in the manufacture of a safety glass laminate and including pinch roll pairs mounted in a carriage which is rotatable about a generally horizontal axis wherein an operator of the machine can select one of a number of stored rotational movement sequences of the carriage corresponding to the laminate to be manufactured or can define new rotational movement sequences for the machine as necessary.

Other objects and advantages of the invention will be apparent from the following description, the accompanying drawings and the appended claims.

DETAILED DESCRIPTION OF THE INVENTION

Figure 1:
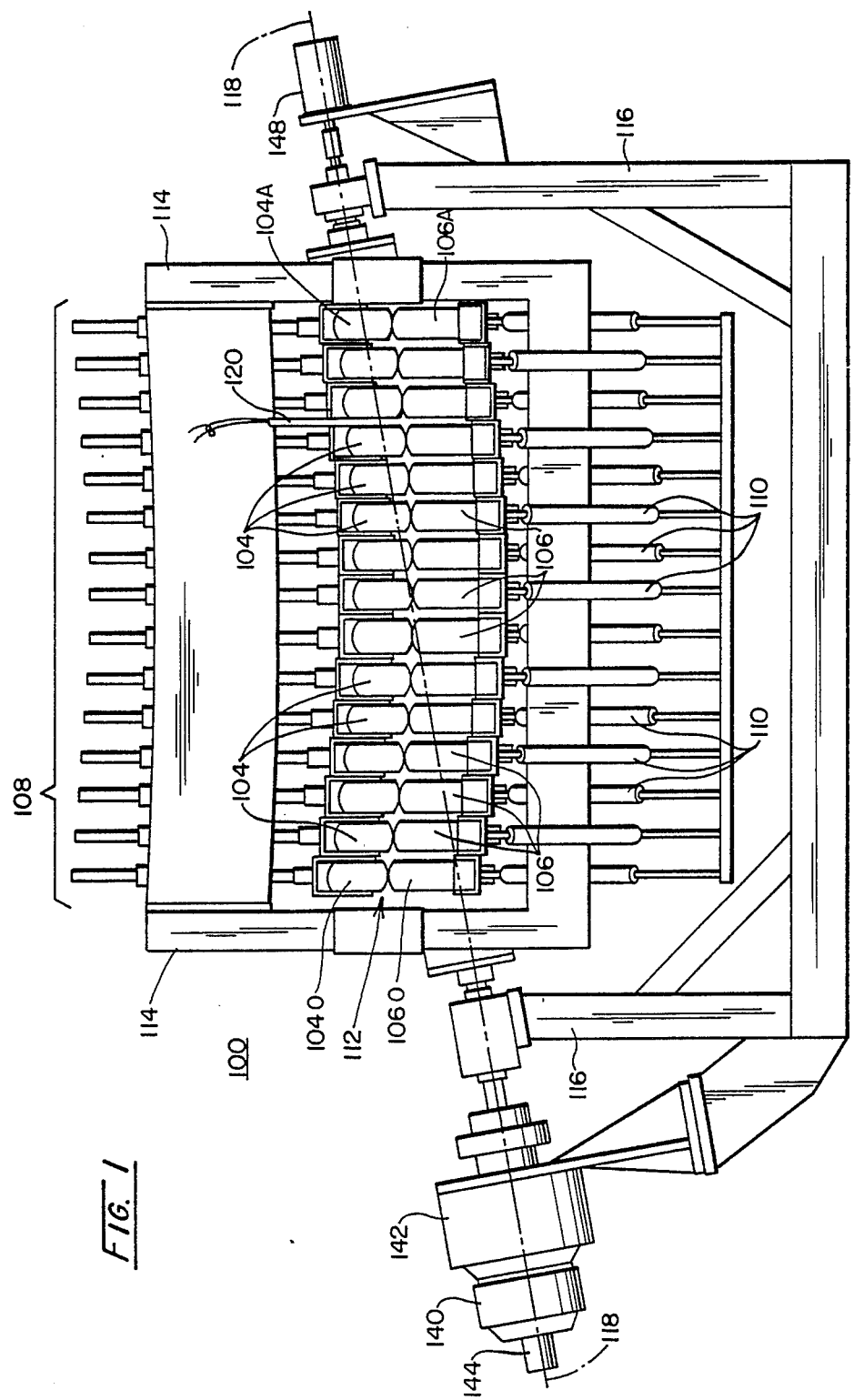
FIG. 1 is a schematic side view of a de-air/tacker machine incorporating the apparatus of the present invention and operable in accordance with the method of the present invention.

Reference is now made to the drawings wherein FIG. 1 is a schematic side view of a machine 100 utilized in the manufacture of safety glass laminates, for example as used for automotive windshields. As is well known in the art, safety glass laminates are prepared from preformed pairs of glass templates which are then separated to sandwich a sheet of transparent plastic therebetween. Polyvinyl butyral is currently the preferred transparent plastic material; however, the particular plastic material used is unimportant to the present invention. The laminates thus formed are then heated to around 140° F. and passed through pressure rollers to remove air from and to promote bonding of the glass/plastic laminates.

Figure 2:
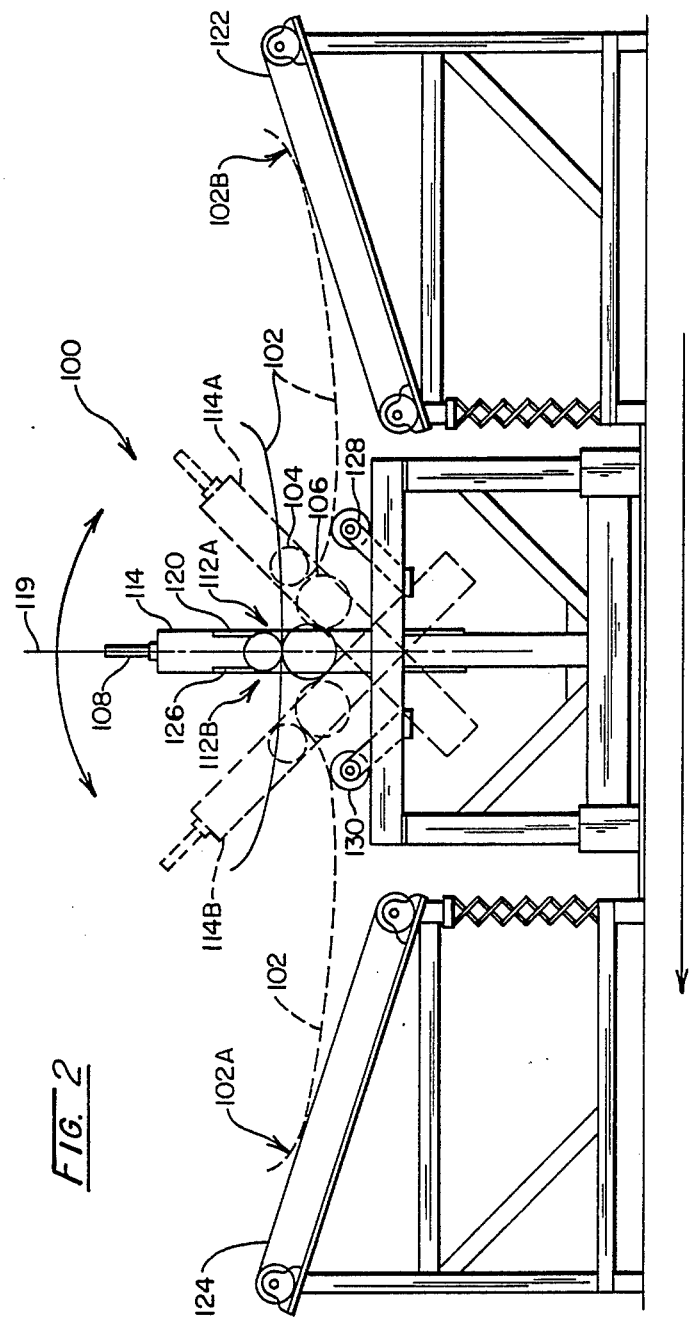
FIG. 2 is schematic end view of the de-air/tacker machine of FIG. 1 incorporated into a section of a production line for manufacturing safety glass laminates.

The heated laminates 102, shown in edge view in FIG. 2, are first passed through a "de-air" machine such as the machine 100. The machine 100 comprises upper pinch rolls 104 located opposite lower pinch rolls 106 to form pinch roll means defined by the series of pinch roll pairs 104A/106A through 104O/106O which are forced against each other, for example pneumatically by air cylinders 108, 110, or otherwise. Ideally, the pinch roll means would be formed by two continuous rolls to define a pressure nip 112 through which the laminates 102 are passed; however, the segmented roll pairs 104/106 are the closest approximation to continuous rolls which are available in the present state of the art.

The pinch roll pairs 104/106 are mounted in a carriage 114 which is in turn mounted for rotation relative to a support frame 116 about a generally horizontal axis 118 such that the carriage 114 and hence the pinch roll means can be rotated as the laminates 102 pass through the nip 112 formed by the pinch roll pairs 104/106. By rotating the carriage 114 as the laminates 102 pass through the nip 112, the pinch roll pairs 104/106, i.e. a plane 119 passing through the axes of rotation of the pinch roll pairs 104/106 shown in FIG. 2, can be maintained substantially normal to the laminates 102 which are therefore balanced within the pinch rolls 104, 106 to prevent breakage of the glass templates of the laminates 102. The axis 118 is referred to as being "generally horizontal" even though in the illustrated embodiment it is oriented at approximately 10° relative to horizontal for ease of description and since such machines are known in the prior art although not controlled as disclosed herein.

The rotational movement of the carriage 114 about the axis 118 is illustrated schematically in FIG. 2 and generally comprises three distinct movements, particularly for the simple safety glass laminate 102 shown. Initially, the carriage 114 is rotated to a home position 114A toward the entry side 112A of the nip 112 such that the entering "wing", i.e. the angular section on one side of the central section of the laminate 102, or first wing 102A can enter the nip 112 substantially normal to the pinch roll pairs 104/106. The pinch rolls 104, 106 are then driven at a first speed to convey the first wing 102A of the laminate through the nip 112 and the carriage 114 is rotated to accommodate this movement of the laminate 102 through the machine 100. Preferably, the first movement is commenced in response to sensing the leading edge of the laminate 102 by laminate sensing means comprising a first optical sensor 120, see FIGS. 1 and 2.

Upon reaching the radius R of the first wing 102A of the laminate 102, the second movement begins. The pinch rolls 104, 106 are driven at a second speed, typically slower speed, to convey and process the central portion of the laminate 102 and the carriage 114 is rotated to accommodate this movement of the laminate 102 through the machine 100. The central point of this second movement, which effectively transfers the laminate 102 from an input conveyor 122 to an output conveyor 124, is shown in FIG. 2 by the solid line drawing.

Upon reaching the radius R of the second wing 102B of the laminate 102, the third movement begins. For the third movement, the rolls 104, 106 are once again driven at the first speed to convey and process the second wing 102B of the laminate 102 and the carriage 114 is rotated to accommodate this movement of the laminate 102 through the machine 100. Preferably, the trailing edge of the laminate 102 is sensed by laminate sensing means comprising a second optical sensor 126, see FIG. 2, such that the carriage 114 can be returned to the home position 114A.

Laminate support rollers 128 and 130 are positioned on the entry and exit sides of the machine 100, respectively, to assist in supporting laminates as they enter and exit the machine 100. In some instances, particularly for the de-air machines, the input conveyor 122 may not be provided, in which case the laminates 102 are manually fed into the machine 100 still partially supported upon and with the assistance of the laminate support roller 128.

Laminates 102 which have been passed through a de-air machine, such as the machine 100, are then heated to around 160° F. to 180° F. by passage through an oven (not shown) from which they are passed to a "tacker" machine which is substantially identical to the de-air machine and also represented by the machine 100. From the tacker machine, the laminates 102 are transferred to an autoclave wherein they are subjected to high pressure and temperature to complete the glass/plastic bonding step of their manufacture.

As previously described, the rotational movement of the pinch roll means or carriage 114 of de-air/tacker machines has been less than satisfactorily controlled either manually or by means of various mechanical/hydraulic arrangements leading to problems in manufacturing safety glass laminates. These problems have been overcome in the present invention by providing motive means taking the form of a dc servo motor 140 which is coupled to the carriage 114 supporting the pinch rolls 104, 106 for rotating the carriage 114 and hence the pinch rolls 104, 106 about the axis 118. The motor 140 is coupled to the carriage 114 through a gearbox 142 which has a 60-to-1 gear ratio in a working embodiment.

Encoder means comprising a digital encoder 144 in the illustrated embodiment is provided for sensing the rotational operation of the motor 140. Control means is connected to the dc servo motor 140 and the digital encoder 144 for operating the motor 140 in accordance with a predefined sequence for each laminate which is passed through the nip 112 of the pinch rolls 104, 106 such that the carriage 114 and hence the pinch rolls 104, 106 mounted thereon are moved such that the carriage 114 is positioned to maintain the pinch roll pairs 104/106 substantially normal to the laminates 102 as the laminates are passed through the machine 100. The control means comprises a digital computer 146, see FIG. 3, programmed to control the dc servo motor 140 in response to a selected program which corresponds to the predefined sequence for rotation of the carriage 114.

Sequence selection means comprising a terminal 148 or other input/output (I/O) device is connected to the computer 146 for selecting a predefined sequence from a number of sequences which are stored within the computer 146 with each stored sequence corresponding to a different laminate to be processed. The terminal 148 or other input/output device also permits the operator of the machine 100 to define a sequence which is not currently stored. New sequences are defined either for a new laminate design or to optimize the performance of the machine 100 in accordance with the skill and experience of the operator. While the machine 100 can be controlled by monitoring and maintaining a record of the position of the motor 140 and hence the rotational position of the carriage 114 to thereby carry out a desired sequence of operations, position sensing means comprising a position sensing potentiometer 148 or similar device can also be coupled to the carriage 114 and the computer 146 for sensing the angular orientation of the carriage 114 about the axis 118 and generating signals representative of the angular orientation, which signals are passed to the computer 146.

While a number of different computer configurations can be assembled to perform the operations outlined above, a working embodiment of the digital computer 146 of the present invention comprises a programmable logic controller (PLC) 150 commercially available from Allen-Bradley as a PLC 2/15 which stores the programs or "recipes" defining operation of the machine 100 for a number of different safety glass laminates and interfaces with the operator input/output device, such as the terminal 148. A program written in Basic computer language and stored in a driver of basic (DB) Module 152 is used to convert the programs or recipes into a program form which is passed to a servo controller 154 commercially available from Whedco as an Intelligent Motor Controller which can then operate the dc servo motor 140 in accordance with the program or recipe selected or generated by the operator. The following programs are illustrative of programs for the Allen-Bradley processor and the Whedco controller, respectively.

BASIC PROGRAM FOR A-B PLC DB MODULE
TO WHEDCO CONTROLLER DOWNLOAD

```
10  REM ** BASIC PROGRAM FOR PLC TO WHEDCO
    INTERFACE**
20  DIM A(9),C(9),Z(9)
30  R=0
40  PUSH 9 : CALL 4
50  PRINT "JUST BEFORE BTW"
60  CALL 6 : PRINT "TOP OF PROGRAM"
70  FOR I=1 TO 9 : PUSH I : CALL 10 : POP Z(I)
80  PRINT Z(I) : NEXT I
90  REM **CONVERSION FACTORS FROM PLC TO
    WHEDCO**
100 REM CONVERSION FACTOR FOR SPEED IS 6
110 A(1)=Z(1)*6 : A(3)=Z(3)*6 : A(6)=Z(60*6
120 REM **CONVERSION FACTOR FOR ABSOLUTE
    MOVE IS 34
130 A(2)=Z(2)*34 : A(4)=Z(4)*34 : A(7)=Z(7)*34
140 REM **CONVERSION FACTOR FOR DELAY TIME
    IS 1
150 A(5)=Z(5) : A(8)=Z(8) : A(9)=Z(9)
160 REM COMPARE FOR DATA CHANGE FROM PLC
170 IF A(1)<>C(1) THEN 270
180 IF A(2)<>C(2) THEN 270
190 IF A(3)<>C(3) THEN 270
200 IF A(4)<>C(4) THEN 270
210 IF A(5)<>C(5) THEN 270
220 IF A(6)<>C(6) THEN 270
230 IF A(7)<>C(7) THEN 270
240 IF A(8)<>C(8) THEN 270
250 IF A(9)<>C(9) THEN 270
260 GOTO 60
270 REM WHEDCO SERVO PROGRAM
280 PRINT #"4DE1"
290 PRINT #"4ED"
300 PRINT #"4DE1"
310 PRINT #"4SP",A(1)
320 PRINT #"4AC1000"
330 PRINT #"4DC500"
340 PRINT #"4AM',A(2)
350 PRINT #"4RAN"
360 PRINT #"4MW"
370 PRINT #"4SP",A(3)
380 PRINT #"4AM",A(4)
390 PRINT #"4DT",A(5)
400 PRINT #"4RAD"
410 PRINT #"4MW"
420 PRINT #"4SP",A(6)
430 PRINT #"4AM",A(7)
440 PRINT #"4DT",A(8)
450 PRINT #"4RAD"
460 PRINT #"4MW"
470 PRINT #"4SP6000"
480 PRINT #"4AC1000"
490 PRINT #"4DC500"
500 PRINT #"4AM0"
510 PRINT #"4DT",A(9)
520 PRINT #"4RAD"
530 PRINT #"4MW"
540 PRINT #"4ED"
550 REM END OF WHEDCO PROFILE
560 FOR I=1 TO 9 : C(I)=A(I) : NEXT I
570 R=A(9) : PRINT "BOTTOM OF PROGRAM" : GOTO 60
```

WHEDCO PROFILE PROGRAM #1-MACHINE CYCLE

4DE1
4SP,A(1) VARIABLE FROM PLC DB MODULE
4AC1000
4DC500

-continued

BASIC PROGRAM FOR A-B PLC DB MODULE
TO WHEDCO CONTROLLER DOWNLOAD

4AM,A(2) VARIABLE FROM PLC DB MODULE
4RAN
4MW
4SP,A(3) VARIABLE FROM PLC DB MODULE
4AM,A(4) VARIABLE FROM PLC DB MODULE
4DT,A(5) VARIABLE FROM PLC DB MODULE
4RAD
4MW
4SP,A(6) VARIABLE FROM PLC DB MODULE
4AM,A(7) VARIABLE FROM PLC DB MODULE
4DT,A(8) VARIABLE FROM PLC DB MODULE
4RAD
4MW
4SP6000
4AC1000
4DC500
4AM0
4DT,A(9) VARIABLE FROM PLC DB MODULE
4RAD
4MW
4ED

WHEDCO PROFILE PROGRAM #2-MANUAL RETURN TO HOME

4DE2
4SP3000
4AC1000
4DC500
4SRH
4MW
4PIZ
4ED

WHEDCO PROFILE PROGRAM #3-MANUAL JOG FORWARD

4DE3
4SP2000
4AC500
4IM6000
4RFN
4MW
4ED

WHEDCO PROFILE PROGRAM #4-MANUAL JOG 137 REVERSE

4DE4
4SP2000
4AC500
4IM6000
4RRN
4MW
4ED

Figure 3:
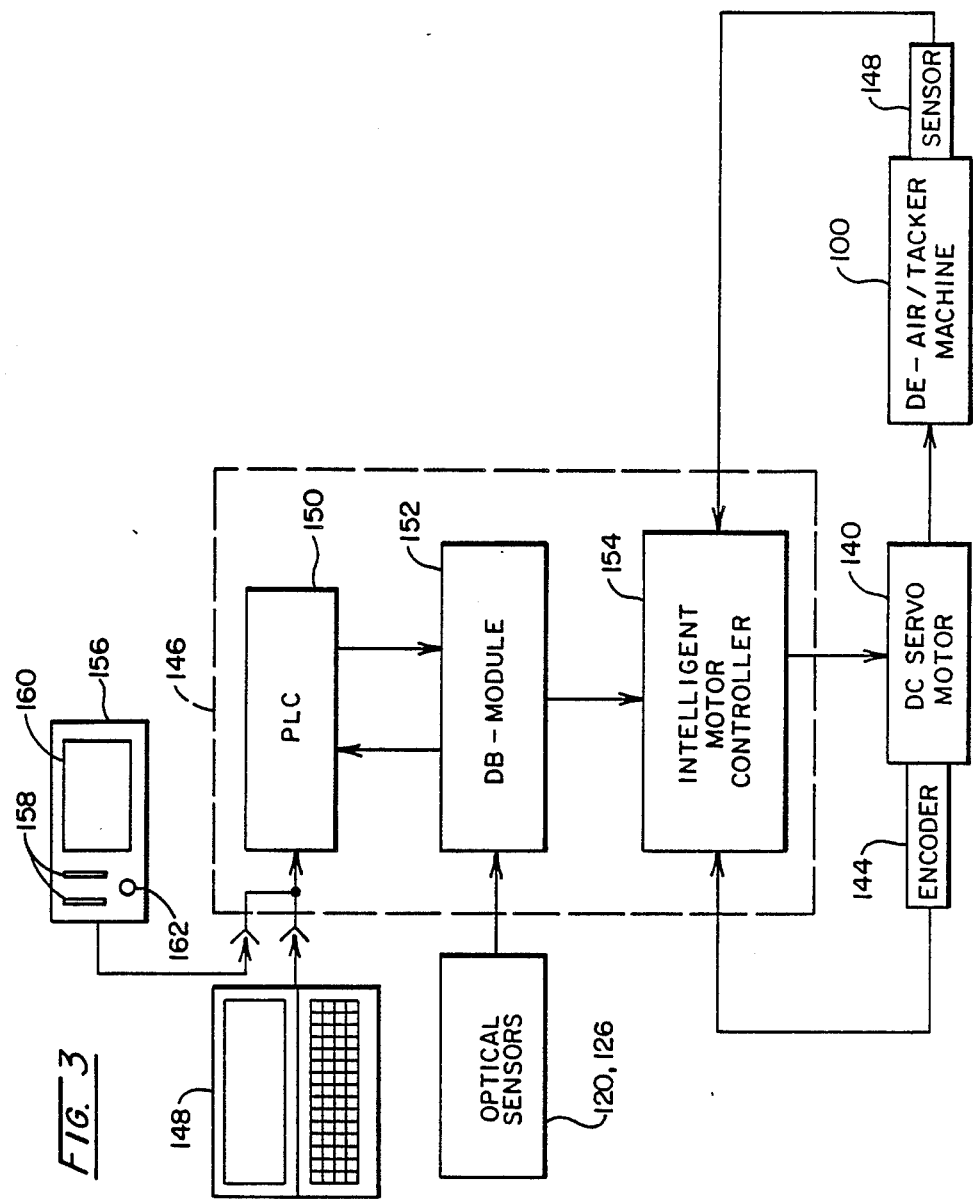
FIG. 3 is a block diagram of a machine control system operable in accordance with the present invention.

It is noted that a simplified I/O device which is more compatible with a production environment may be preferred for the present invention. For example, an I/O device 156 for use with the digital computer 146 (PLC 150) may comprise a pair of 10 position thumbwheel switches 158, a display device 160 and an enter switch 162 as shown in FIG. 3. The simplified I/O device 156 can be economically implemented and easily used by an operator of the machine 100 to both recall existing programs or recipes for safety glass laminates and also to program new recipes of the form shown in TaWeI. In the program format of TaWeI which is used with the preceding programs, up to 15 inputs can be provided to the digital computer 146 (PLC 150). While the inputs and outputs clearly can be handled by the terminal 148, they can also be handled by the simplified I/O device 156 in the following manner.

Since only 15 variables are to be input for any one recipe, any combined initial input on the thumbwheel switches 158 which exceeds 15 is presumed by the computer 146 (PLC 150) to be a code identifying a stored program or recipe which is accordingly called and executed by simply entering the code and pressing the enter switch 162. If a new program/recipe is to be entered or one of the existing, up to 15, parameters of a stored program is to be modified, the parameter number is set on the switches 158, the enter switch 162 is operated, the existing parameter is displayed on the display device 160 and the new or redefined value is then entered on the switches 158 and the enter switch 162 is again operated. Each parameter to be entered or changed is identified and then entered to define, upgrade or customize a program/recipe.

The parameters which can be defined for each program/recipe are set forth in TaWeI. For ease of entry and clarity sake, the following definitions apply. The home position is the angular orientation in degrees of the carriage 114 relative to horizontal when the carriage is placed into the home position 114A. The movement delay periods are to be inserted before that movement is performed and the number entered by the operator is interpreted by the computer 146 (PLC 150) to be in tenths of a second. The movement speeds are in terms of pulses generated by the digital encoder 144 over time and the movement distance is also in terms of pulses from the digital encoder 144 and may be compared with the signal from the sensor 148 to verify accurate operation of the system. The reverse movement delay is the period of time the system waits before returning the carriage to its home position 114A after the trailing edge of a laminate has been sensed and the number entered by the operator is interpreted by the computer 146 (PLC 150) to be in tenths of a second.

The speed of conveyance through the machine 100 can be selected for the processing of the first and second wings 102A, 102B although usually a default speed is utilized. Provision may be made for reVerse movement of the carriage 114 via extra data entries 14 and 15 for substantially flat or reverse curvature windshields. Data entries 14 and 15 can also be used for alternate operating applications or additional data entries could be provided, if required, as will be apparent to those skilled in the art. The ability to accommodate such laminate formations is important since automotive windshields have been moving in this direction as automobiles become more and more aerodynamic. Of course, different programs or computer control systems can be used in the present invention for existing laminate designs or in the future for yet unknown, more exotic laminate formations.

The following are examples of programs or recipes which have been used to successfully manufacture safety glass windshield laminates. Since parameters may vary between the de-air and tacker machines on the same production line, both sets of parameters are provided.

| PROGRAM SET-UP FOR DE-AIR/TACKER MACHINES | | | | |
|---|---|---|---|---|
| | Taurus | | Mustang | |
| | De-Air | Tacker | De-Air | Tacker |
| 1-home position | 41 | 41 | 40 | 41 |
| 2-for. mov't delay | 1 | 1 | 1 | 1 |
| 3-1st mov't speed | 20 | 20 | 20 | 20 |
| 4-1st mov't dist. | 10 | 10 | 10 | 10 |
| 5-2nd mov't speed | 15 | 15 | 15 | 15 |
| 6-2nd mov't dist. | 32 | 36 | 36 | 39 |
| 7-2nd mov't delay | 21 | 18 | 23 | 21 |
| 8-3rd mov't speed | 10 | 10 | 10 | 10 |
| 9-3rd mov't dist. | 42 | 42 | 42 | 46 |
| 10-3rd mov't delay | 40 | 28 | 32 | 20 |

| PROGRAM SET-UP FOR DE-AIR/TACKER MACHINES -continued | | | | |
|---|---|---|---|---|
| | Taurus | | Mustang | |
| | De-Air | Tacker | De-Air | Tacker |
| 11-rev. mov't delay | 18 | 15 | 24 | 16 |

In these recipes, the default speed is selected for the speed of conveyance of the wings 102A and 102B, and no entries have been made for reverse movement of the carriage 114 (entries 14, 15).

Operation of the described apparatus in accordance with the method of the present invention. although apparent from the foregoing description, will now be described for sake of clarity and completeness. The method provides for controlling the operation of a de-air/tacker machine, such as the machine 100, used in the manufacture of safety glass laminates 102 to remove air from and promote a bonding operation within the laminates 102 and comprises the steps of: coupling a dc servo motor 142 to the carriage 114 which supports the pinch rolls 104, 106 for rotating the carriage 114 about the axis 118; connecting the digital encoder 144 to the motor 142 for sensing the motion of the motor 142; and operating the motor 142 in accordance with a predefined sequence for each laminate 102 which is passed through the pinch rolls 104, 106 whereby the pinch rolls 104, 106 are moved such that the pinch roll pairs 104/106 are maintained substantially normal to the laminates 102 as the laminates 102 are passed through the machine 100 to substantially eliminate breakage of glass templates of the laminates 102.

The method may further comprise the step of selecting a predefined sequence from a number of stored sequences which each correspond to different laminates by means of the terminal 148 or other I/O device typified by the I/O device 156. The additional step of defining a sequence which is not included within the number of stored sequences may be performed by use of an appropriate I/O device for a new laminate or to optimize performance of the method in accordance with an operator's skill and experience. To facilitate operation of the method of the present invention, the method may further comprise the step of sensing the positioning of laminates 102 within the pinch rolls 104, 106 such that the step of operating the motor 142 in accordance with a defined sequence for each laminate 102 can commence at an appropriate time corresponding to movement of the laminate 102.

The step of sensing the positioning of laminates 102 within the pinch rolls 104, 106 may comprise sensing the entrance of laminates 102 into the pinch rolls 104, 106 and sensing the exit of laminates 102 from the pinch rolls 104, 106. For such sensing, the method may further comprise the step of positioning the pinch rolls 104, 106 to a home position 114A upon sensing the exit of laminates 102 from the pinch rolls 104, 106 to initialize the operation of the machine 100. While additional steps may be included where necessary or desired, the defined sequence may comprise three steps, each of the steps comprising the substeps of delaying movement of the pinch rolls 104, 106 for a defined period of time, then moving the pinch rolls 104, 106 at a defined speed through a defined distance. The three steps correspond to the three portions of safety glass laminates utilized for automotive windshields, i.e. the central portion of the windshield and the angular sections or "wings" formed on both ends of the central portion.

Having thus described the method and apparatus for use in manufacturing safety glass laminates of the present invention in detail and by reference to preferred embodiments thereof, it will be apparent that modifications and variations are possible without departing from the scope of the invention defined in the appended claims.

What is claimed is:

1. Apparatus for controlling the operation of a machine used in the manufacture of a safety glass laminate to remove air from said laminate and promote a bonding operation therewithin, said machine comprising pinch roll means mounted for rotational movement about a generally horizontal axis and defining a pressure nip by rolls through which said laminate passes, said apparatus comprising:

motive means coupled to said pinch roll means for rotating said pinch roll means about said axis;

encoder means for sensing the motion of said motive means; and control means connected to said motive means and said encoder means for operating said motive means to rotate said pinch roll means in accordance with a sequence predefined for said laminate to maintain said pinch roll means oriented substantially normal to said laminate as it passes through said pinch roll means, said control means comprising sequence storage means for storing a number of predefined sequences which each correspond to different laminates and said apparatus further comprising sequence selection means connected to said control means for selecting one of said predefined sequences and including sequence definition means for defining a sequence which is not included within said number of stored predefined sequences to permit an operator to define a new sequence for a new laminate and to modify one of said predefined sequences for optimization of the operation of said apparatus.

2. Apparatus for controlling the operation of a machine used in the manufacture of a safety glass laminate as claimed in claim 1 further comprising position sensing means coupled to said pinch roll means and said control means for sensing the angular orientation of said pinch roll means about said axis and generating signals representative of said angular orientation, which signals are passed to said control means.

3. Apparatus for controlling the operation of a machine used in the manufacture of a safety glass laminate as claimed in claim 1 further comprising laminate sensing means coupled to said control means for sensing the entrance of said laminate into said pinch roll means such that said control means can properly commence performance of a sequence.

4. Apparatus for controlling the operation of a machine used in the manufacture of a safety glass laminate as claimed in claim 3 wherein said laminate sensing means further provides for sensing the exit of said laminate from said pinch roll means such that said control means can return said pinch roll means to a home position in preparation for the next laminate to be handled by said machine.

5. Apparatus for controlling the operation of a machine used in the manufacture of a safety glass laminate as claimed in claim 4 wherein said laminate sensing means comprises a pair of optical sensors, one optical sensor positioned on a laminate receiving side of said nip and one optical sensor positioned on a laminate exiting side of said nip.

6. Apparatus for controlling the operation of a machine used in the manufacture of a safety glass laminate as claimed in claim 1 wherein said motive means comprises a dc servo motor coupled to said pinch roll means through a gearbox.

7. Apparatus for controlling the operation of a machine used in the manufacture of a safety glass laminate as claimed in claim 6 wherein said control means comprises a digital computer programmed to control said dc servo motor in response to a program corresponding to said predefined sequence.

8. Apparatus for controlling the operation of a machine used in the manufacture of a safety glass laminate as claimed in claim 1 wherein said sequence selection means comprises input switches connected to said control means.

9. A method for controlling the operation of a machine used in the manufacture of a safety glass laminate to remove air from said laminate and promote a bonding operation therewithin, said machine comprising pinch roll means mounted for rotational movement about a generally horizontal axis and defining a pressure nip by rolls through which said laminate passes, said method comprising the steps of:
coupling motive means to said pinch roll means for rotating said pinch roll means about said axis;
connecting encoder means to said motive means for sensing the motion of said motive means;
storing a number of predefined sequences which each correspond to different laminates;
selecting one of said predefined sequences corresponding to said laminate;
modifying the selected one of said predefined sequences to define a sequence which is not included within said number of stored predefined sequences; and
operating said motive means to rotate said pinch roll means in accordance with the modified sequence for said laminate to maintain said pinch roll means oriented substantially normal to said laminate as it passes through said pinch roll means.

10. A method for controlling the operation of a machine used in the manufacture of a safety glass laminate as claimed in claim 9 further comprising the step of sensing the positioning of said laminate within said pinch roll means such that the step of operating said motive means in accordance with the modified sequence for each laminate can commence at an appropriate time.

11. A method for controlling the operation of a machine used in the manufacture of a safety glass laminate as claimed in claim 10 wherein the step of sensing the positioning of said laminate within said pinch roll means comprises sensing the entrance of said laminate into said pinch roll means and sensing the exit of said laminate from said pinch roll means.

12. A method for controlling the operation of a machine used in the manufacture of a safety glass laminate as claimed in claim 11 further comprising the step of positioning said pinch roll means to a home position in response to sensing the exit of said laminate from said pinch roll means to initialize the operating position of said machine.

13. A method for controlling the operation of a machine used in the manufacture of a safety glass laminate as claimed in claim 9 wherein said modified sequence comprises three steps, each of said steps comprising the substeps of delaying movement of said pinch roll means for a defined period of time, then moving said pinch roll means at a defined speed through a defined distance.

14. A method for controlling the operation of a machine used in the manufacture of a safety glass laminate as claimed in claim 9 wherein said motive means comprises a dc servo motor coupled to said pinch roll means through a gearbox.

15. A method for controlling the operation of a machine used in the manufacture of a safety glass laminate as claimed in claim 11 wherein the step of sensing the positioning of said laminate within said pinch roll means is performed by sensing means comprising a pair of optical sensors, one optical sensor positioned on a laminate receiving side of said nip and one optical sensor positioned on a laminate exiting side of said nip.

16. A method for controlling the operation of a machine used in the manufacture of a safety glass laminate as claimed in claim 14 wherein the step of operating said motive means in accordance with the modified sequence for said laminate is performed by control means comprising a digital computer programmed to control said dc servo motor in response to a program corresponding to the modified sequence.

* * * * *